(12) United States Patent
Kanabar et al.

(10) Patent No.: US 10,637,802 B2
(45) Date of Patent: Apr. 28, 2020

(54) SYSTEMS AND METHODS FOR NETWORK FAILOVER IN DIGITAL SUBSTATIONS

(71) Applicant: General Electric Technology GmbH, Baden (CH)

(72) Inventors: Mitalkumar G. Kanabar, Markham (CA); Ihab Hamour, Markham (CA)

(73) Assignee: General Electric Technology GmbH, Baden (CH)

( * ) Notice: Subject to any disclaimer, the term of this patent is extended or adjusted under 35 U.S.C. 154(b) by 246 days.

(21) Appl. No.: 15/483,591

(22) Filed: Apr. 10, 2017

(65) Prior Publication Data

US 2018/0034746 A1 Feb. 1, 2018

Related U.S. Application Data

(63) Continuation-in-part of application No. 15/222,484, filed on Jul. 28, 2016.

(51) Int. Cl.
*H04L 12/939* (2013.01)
*H04L 12/24* (2006.01)
*H02J 13/00* (2006.01)

(52) U.S. Cl.
CPC ........ *H04L 49/557* (2013.01); *H02J 13/0006* (2013.01); *H04L 41/069* (2013.01); *H04L 41/0654* (2013.01); *H04L 41/0806* (2013.01); *Y02E 60/723* (2013.01); *Y02E 60/724* (2013.01); *Y02E 60/74* (2013.01); *Y04S 10/16* (2013.01); *Y04S 10/18* (2013.01); *Y04S 10/30* (2013.01)

(58) Field of Classification Search
CPC ............. H02J 13/0006; H04L 41/0654; H04L 41/069; H04L 41/0806; H04L 49/557; Y02E 60/723; Y02E 60/724; Y02E 60/74; Y04S 10/16; Y04S 10/18; Y04S 10/30
See application file for complete search history.

(56) References Cited

U.S. PATENT DOCUMENTS

2008/0127210 A1* 5/2008 Bosold ................. H04L 67/025
719/313
2010/0256832 A1* 10/2010 Kirrmann .............. H02H 7/261
700/293

(Continued)

*Primary Examiner* — Gil H. Lee
(74) *Attorney, Agent, or Firm* — Eversheds Sutherland (US) LLP (57) ABSTRACT

Systems and methods for network failover in digital substations are provided. One method includes receiving, by an intelligent electronic device (IED) from a process interface unit (PIU), in parallel a pre-configured data stream via a point-to point connection and one or more other data streams via an Ethernet network. The method further includes determining that at least one of the following failure conditions is satisfied: a frame in the pre-configured data stream is lost or delayed, quality of the data in the frame in the data stream is below a first threshold, period of the time associated with the data in the frame in the data stream is below a second threshold, or a health indicator associated with the PIU is below a third threshold. The method further allows identifying at least one redundant frame in the one or more other data streams. If the quality of data in redundant frame is satisfactory, the method proceeds to use the redundant frame for further processing.

10 Claims, 6 Drawing Sheets

(56) References Cited

U.S. PATENT DOCUMENTS

| | | | | |
|---|---|---|---|---|
| 2012/0123603 A1* | 5/2012 | Werner | ............... | H02H 7/261 |
| | | | | 700/292 |
| 2013/0031164 A1* | 1/2013 | Sundaram | ............ | H02H 7/261 |
| | | | | 709/203 |
| 2013/0117796 A1* | 5/2013 | Qi | .................. | H04N 21/44209 |
| | | | | 725/116 |
| 2014/0136002 A1* | 5/2014 | Gopalakrishnan | ....... | H04Q 9/00 |
| | | | | 700/286 |
| 2015/0281709 A1* | 10/2015 | Bracha | ................ | H04N 19/36 |
| | | | | 375/240.26 |

\* cited by examiner

SYSTEMS AND METHODS FOR NETWORK FAILOVER IN DIGITAL SUBSTATIONS

RELATED APPLICATION

This application is a continuation-in-part of and claims priority to U.S. Ser. No. 15/222,484, titled "Systems and Methods for Configuration-Less Process Bus with Architectural Redundancy in Digital Substations," filed Jul. 28, 2016, the contents of which are incorporated herein by reference.

TECHNICAL FIELD

The disclosure relates to a digital substation and, more particularly, to systems and methods for network failover in digital substations.

BACKGROUND

The use of digital substations has been increasing. Differences between digital substations and conventional substations can include a reduction in wiring between components of a substation (such as transformers, circuit breakers, protection relays, and so forth) and sharing of information among multivendor devices to provide interoperability of the devices.

Operations of the components of a digital substation can be automated using merging units (MUs) or process interface units (PIUs) and Intelligent Electronic Devices (IEDs). The IEDs can be programmed to monitor, control, and protect the substation components. A process bus, such as an Ethernet network, can be used to organize communications between IEDs and the MUs/PIUs.

Conventional standards can include requirements for physical security and cyber security of equipment in a switchyard of a digital substation. Meeting the requirements may require a certain engineering process for configuration of IEDs and a process bus. Any reconfiguration or maintenance of equipment of the digital substation may be expensive and time consuming.

Additional measures may be needed to ensure reliability of communications between IEDs and the substation components. Conventional solutions for providing the reliability of the communications may be based on parallel redundancy protocol (PRP) or High-availability Seamless Redundancy (HSR) protocol. However, the parallel redundancy for the PRP or HSR may be provided using similar Ethernet switched networks, which can be prone to similar failure modes associated with packet switching techniques.

SUMMARY OF THE DISCLOSURE

This disclosure relates to systems and methods for network failover in digital substations. Certain embodiments of the disclosure can enhance cyber security, engineering, reliability, and maintenance of digital substations.

According to one embodiment of the disclosure, a method for providing network failover is provided. The method can include providing at least one process interface unit (PIU). The method can further include providing at least one intelligent electronic device (IED) being communicatively coupled to the at least one PIU. The method may further include providing an Ethernet network configured to transmit data between the PIU and the IED. The method may allow receiving in parallel, by the IED, from the PIU, a pre-configured data stream, via a point-to-point connection between the PIU and the IED, and one or more other data streams via the Ethernet network. The method further includes determining, by the IED, that at least one of failure conditions is satisfied. The at least one of the failure conditions include one or more of the following: at least one frame in the pre-configured data stream is lost or delayed, a quality of the data in the at least one frame in the pre-configured data stream is below a first threshold, a period of a time associated with the data in the at least one frame in the pre-configured data stream is below a second threshold, and a health indicator associated with one of a behavior and an operation mode of the PIU is below a third threshold. Responsive to the determination, the method may include identifying, by the IED, at least one redundant frame in the one or more other data streams. The method can also include determining, by the IED, that the quality of the data in the redundant frame is above the first threshold and the period of the time in the redundant frame is above the second threshold. If the result of the determination is positive, the method may proceed with processing, by the IED, the redundant frame, wherein processing includes at least transforming the data. If, on the other hand, the result of the determination is negative, the method may include determining, by the IED, a number of frames in the pre-configured data stream for which the failure conditions are satisfied. If the number of frames is below a tolerance threshold, the method may proceed with labeling, by the IED, at least one frame as having a poor quality and sending the frame for further processing. If the number is above the tolerance threshold, the method proceeds with issuing, by the IED, at least one alarm.

In some embodiments, the method may further include determining, based on predetermined criteria, by the IED, whether the pre-configured data stream includes quality data.

In some embodiments, the PIU includes at least one pre-configured communication port defined by one of a factory setting or a product code order.

In some embodiments, at least one of the pre-configured data stream and the one or more other data streams include at least one dataset. The at least one dataset may include at least one field for a unique identifier (UID). In certain embodiments, the method may further include mapping, by the IED, the dataset to a user-defined source based on the UID. In some embodiments, the method may further include transforming, by the IED, the dataset based on user-defined transformation factors to avoid a configuration by the PIU.

In some embodiments, the dataset includes a Generic Object Oriented Substation Event. In certain embodiments, the dataset includes sampled values. The sampled values can include at least one of a current output directly measured from a current transformer and a voltage output directly measured from a voltage transformer.

Other embodiments, systems, methods, features, and aspects will become apparent from the following description taken in conjunction with the following drawings.

The following detailed description includes references to the accompanying drawings, which form part of the detailed description. The drawings depict illustrations, in accordance with example embodiments. These example embodiments, which are also referred to herein as "examples," are described in enough detail to enable those skilled in the art to practice the present subject matter. The example embodiments may be combined, other embodiments may be utilized, or structural, logical, and electrical changes may be made, without departing from the scope of the claimed subject matter. The following detailed description is, therefore, not to be taken in a limiting sense, and the scope is defined by the appended claims and their equivalents.

DETAILED DESCRIPTION

Certain embodiments of the disclosure can include systems and methods for network failover in digital substations. In certain instances, some embodiments of the systems and methods can enhance security and stability of the digital substations by eliminating or otherwise minimizing the need for physical security and by providing cybersecurity of equipment in the digital substations. Certain embodiments of the disclosure may provide an architectural redundancy of a communication network by allowing the elimination or minimizing of common modes of failure in redundant communications channels.

In certain embodiments of the disclosure, a system for network failover is provided. The system can include at least one process interface unit (PIU). The PIU may include at least one pre-configured communication port defined by one of a factory setting or a product code order. The PIU may be operable to transmit and receive a data stream. The data stream may include at least one pre-configured dataset. The pre-configured dataset from PIU may include at least one field for sampled values measured at least at one source. The source may include at least one of a current transformer (CT) or a voltage transformer (VT). The pre-configured dataset may further include a field for a unique identifier associated with the source. The system may include at least one intelligent electronic device (IED) communicatively coupled to the PIU. The IED may be operable to receive the data stream from the PIU and transform the sampled values based on user-defined transformation factors and, thereby, avoiding configuration in the PIU.

In some embodiments of the disclosure, the system may include an Ethernet network operable to transmit data streams between the PIU and the IED with or without Ethernet redundancy protocols, such as IEC 62439 based Parallel Redundancy Protocol (PRP) or High-availability Seamless Redundancy (HSR) or Media Redundancy Protocol (MRP), etc. In some embodiments, the IED may be further operable to receive from the PIU in parallel: the pre-configurable data stream via a point-to-point connection and one or more other data streams via the Ethernet network. In certain embodiments, the IED can be further operable to adjust quality of the data in the pre-configured stream using the one or more other data streams based on a network failover mechanism.

In certain embodiments of the disclosure, a network failover mechanism can include determining that at least one of failure conditions is satisfied: at least one frame in the pre-configured data stream is lost or delayed, quality of the data in the at least one frame in the data stream is below a first threshold, quality of the time associated with the data in the at least one frame in the data stream is below a second threshold, or a health indicator associated with one of a behavior or an operation mode of the at least one PIU is below a third threshold. Responsive to the determination, the network failover mechanism can provide identifying at least one redundant frame in the one or more other data streams. The network failover mechanism can include determining whether the quality of the data in the redundant frame is above the first threshold and the quality of the time in the at least one redundant frame is above the second threshold. If the results of the determination are positive, a network failover mechanism may use at least one redundant frame for processing. If, on the other hand, the results of the determination are negative, the network failover mechanism may determine a number of frames in the data stream for which the failure conditions are satisfied. If the number is below a tolerance threshold, the network failover mechanism can label the frames as having poor quality and send the frames for further processing. If the number is above the tolerance threshold, the network failover mechanism may proceed with issuing at least one alarm.

Technical effects of certain embodiments of the disclosure may include providing compliance with infrastructure protection requirements without need for physical security of merging units in switchyards of digital substations. Further technical effects of certain embodiments of the disclosure may allow reducing engineering effort in a configuration of a process bus for a customer or project team. Certain technical effects of certain embodiments of the disclosure may also provide increased reliability of the process bus, thus improving the functionality of the process bus.

Figure 1:
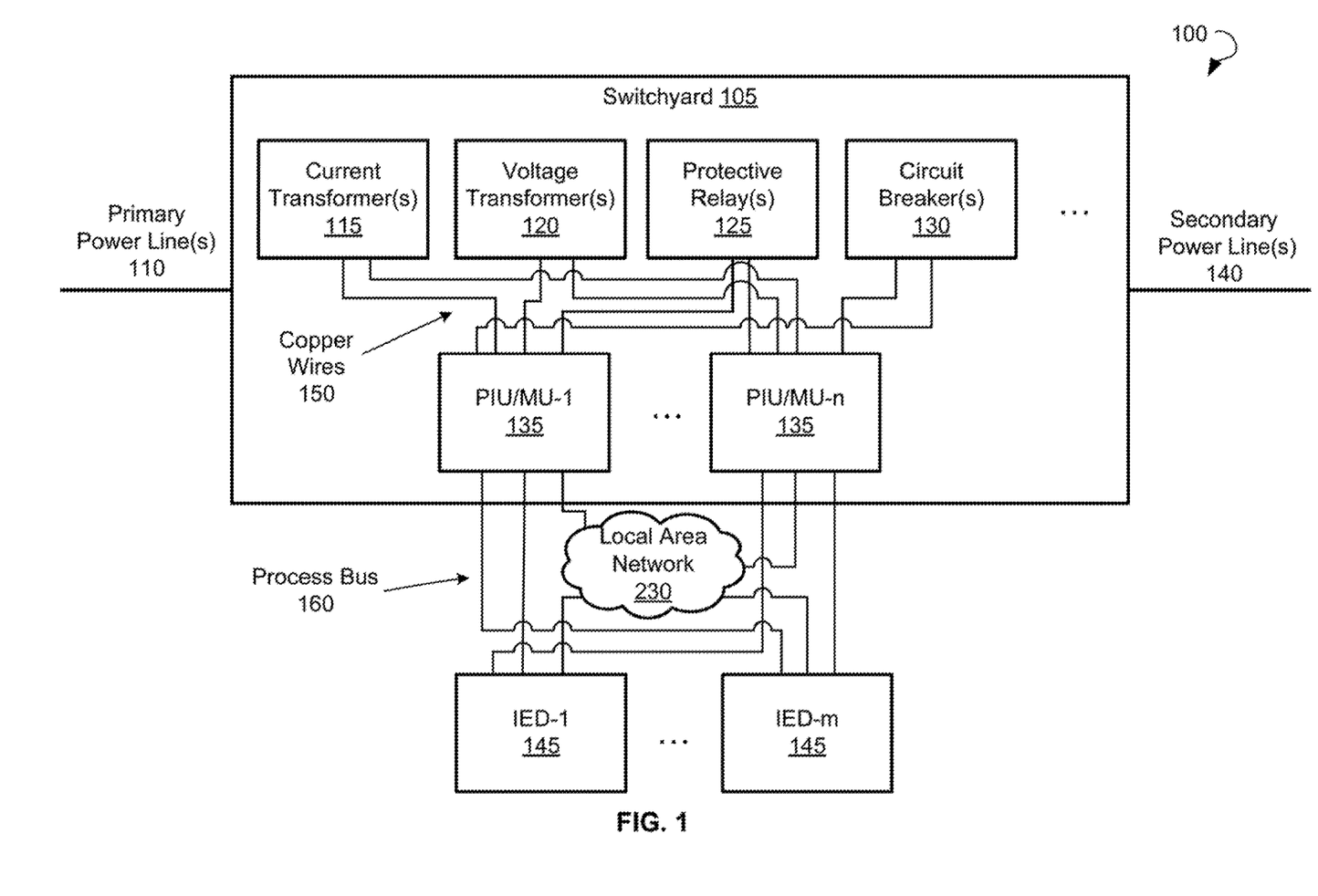
FIG. 1 is a block diagram illustrating an example digital substation, according to certain embodiments of the disclosure.

Turning now to the drawings, FIG. 1 is a block diagram illustrating an example digital substation 100, according to certain embodiments of the disclosure. The digital substation 100 may include a switchyard 105. The switchyard 105 may include primary equipment such as, but not limited to, CTs 115, VTs 120, protective relays 125, circuit breakers 130, switchgears, and other devices involved in operations of the digital substation 100. The CTs 115 and VTs 120 can be operable to receive high voltage current via primary power lines 110 and transfer a low voltage current to secondary power lines 140. In some embodiments, the switchyard 105 can include process interface units/merging units (PIU/MUs) 135. The PIU/MUs 135 can be operable to measure current and voltage from the CTs 115 and the VTs 120 and provide control commands to the protective relays 125. In response to receiving the control commands, the protective relays 125 may be configured to trip the circuit breakers 130. In some embodiments, the PIU/MUs 135 can be connected, via copper wires, to the CTs 115, the VTs 120, and/or the protective relays 125.

In some embodiments, data measured by the PIU/MUs 135 can be provided to one or more IEDs 145. The IEDs 145 may be operable to analyze the data obtained from PIU/MUs 135, make a decision based on the analysis, and send control commands back to the PIU/MUs 135. The data may include one or more sampled values (SV) and associated event data, such as data formatted as Generic Object Oriented Substation Event (GOOSE) data. The SV can include electrical measurements received from the CTs 115 and the VTs 120 converted by the PIU/MUs 135 into a digital format. The GOOSE data may flow bi-directionally. The GOOSE data may include digitized status or analog information obtained by PIU/MUs 135 from process and sent to IEDs 145. The GOOSE data may further include output or functions from IEDs 145 to PIU/MUs 135. In various embodiments of the disclosure, the IEDs 145 and the PIU/MUs 135 may include a controller (a combination of hardware and software) for data processing. An example controller suitable for the data processing is described below with reference to FIG. 6.

A process bus 160 (a specific communications arrangement) can be used to organize communications between the PIU/MUs 135 and the IEDs 145. In some embodiments, the process bus may include point-to-point communications between the IEDs 145 and the PIU/MUs 135. In some embodiments, the process bus 150 may include an Ethernet-based local area network (LAN) 230 configured to provide a connection between the PIU/MUs 135 and IEDs 145. The LAN 230 may include optical wires and Ethernet switches.

Figure 2:
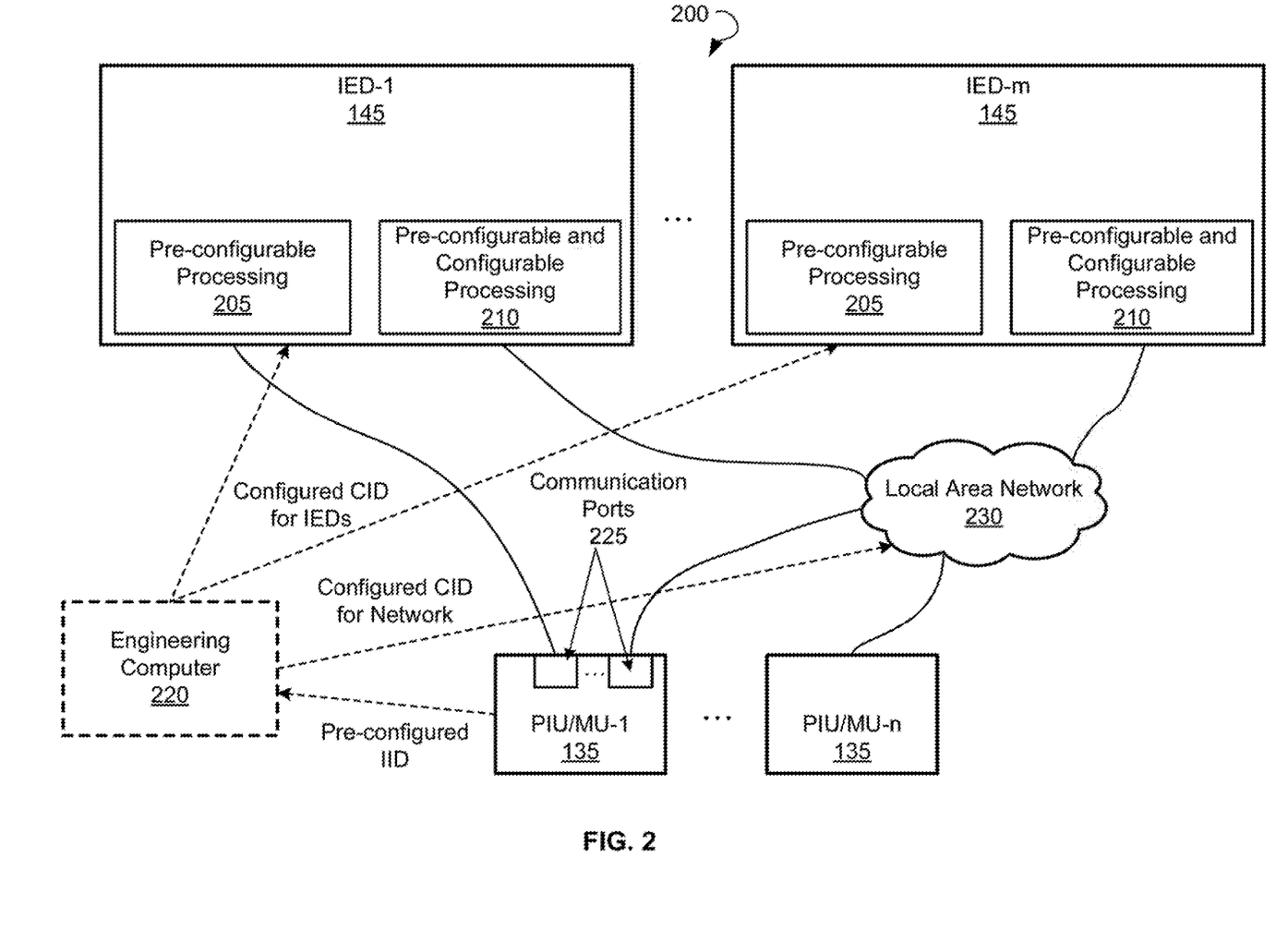
FIG. 2 is a block diagram illustrating an example configuration-less process bus, according to certain embodiments of the disclosure.

FIG. 2 is a block diagram illustrating an example system 200 for a configuration-less process bus, according to certain embodiments of the disclosure. The system 200 can include IEDs 145, PIU/MUs 135, LAN 230, and engineering computer 220. The PIU/MUs 135 include communications ports 225. The PIU/MUs 135 may supports four or more communication ports 225 with individual logical devices and time synchronization clocks.

In some embodiments of the disclosure, the IEDs 145 may include a pre-configurable processing 205 of data received from at least one of the PIU/MUs 135. In some embodiments, the IEDs 145 may include a pre-configurable and configurable processing 210 of datasets received from at least one of the PIU/MUs 135. An individual PIU/MU 135 may provide data to a specific IED 145 via a point-to-point connection. In some embodiments, the pre-configurable processing 205 is operable to process the datasets obtained via the point-to-point connection. In some embodiments, an individual configured or pre-configured PIU/MU 135 may publish datasets to LAN 230, thereby allowing the IEDs 145 to subscribe to receive the data from PIU/MUs 135. In some embodiments, the pre-configurable and configurable processing 210 may process the data obtained via LAN 230.

In some embodiments of the disclosure, components of the system 200 for a process bus are preconfigured using factory settings and/or product order codes of primary equipment and PIU/MUs 135. In some embodiments, the PIU/MUs 135 may be operable to transfer data to the IEDs 145 in datasets. The datasets may include a unique identifier (UID) and digitized SV. The digitized SV may include secondary values measured from available CTs 115, VTs 120, and timestamps or sampled count. The transferred and received datasets may also include GOOSE data based on available hardware for contact inputs (CI) to the protective relays 125 and other logical/device statuses. In some embodiments, the PIU/MUs 135 may receive pre-configured datasets including GOOSE data for contact outputs (CO) from the protective relays 125 and other related commands and statuses. In some embodiments, data stream between PIU/MUs 135 and IEDs 145 is formatted based on the IEC 61850 or IEC 61869 format.

In some embodiments of the disclosure, the PIU/MUs 135 may be configured to stream measured SV with the UID. The measured SV may include raw samples of currents and voltages from CTs 115 and VTs 120 in secondary values. The PIU/MU 135 can specify a fixed (factory provided) pre-configuration (including UID) using IID. The PIU/MUs 135 may not need a configured IED description (CID) file for configuration. Therefore, the PIU/MUs 135 may not require any configuration at the installation site.

In some embodiments of the disclosure, the IEDs 145 and switches of LAN 230 may be configured with CID files using the pre-configured IID (factory provided) files of the PIU/MUs 135. In some embodiments, the IEDs 145 can receive streams of SV in secondary values with UID. After receiving the SV, the IEDs 145 may apply user-configurable transformation factors (TFs), for example CT ratios and VT ratios, ratio or angle errors, and so forth, in order to convert the received SV to other formats (for example, primary values) to perform further processing.

In some other embodiments of the disclosure, the PIU/MUs 135 can apply TFs or other format factors communicated from the factory as part of an order code or factory service settings if the factory hardcodes the format factors in the PIU/MUs 135. In these embodiments, the PIU/MUs 135 can send a factory-configured stream with a factory-configured ID (instead of UID) and factory-configured TFs for SV streams in primary values instead of applying user-configurable TFs to secondary values in the IEDs 145.

In certain embodiments, the engineering computer 220 may be needed for an initial configuration of the IEDs 145 and the LAN 230. At time of first use of the system 200, for example, at commissioning of the digital substation 100, the engineering computer 220 may be used to read the pre-configured IID files of the PIU/MUs 135. The IEDs 145 and network switches of LAN 230 can be configured then with CID files using the pre-configured IID files of the PIU/MUs 135. The engineering computer 220 may not be needed during regular operations of the digital substation 100 and can be removed from the system 200.

Figure 3:
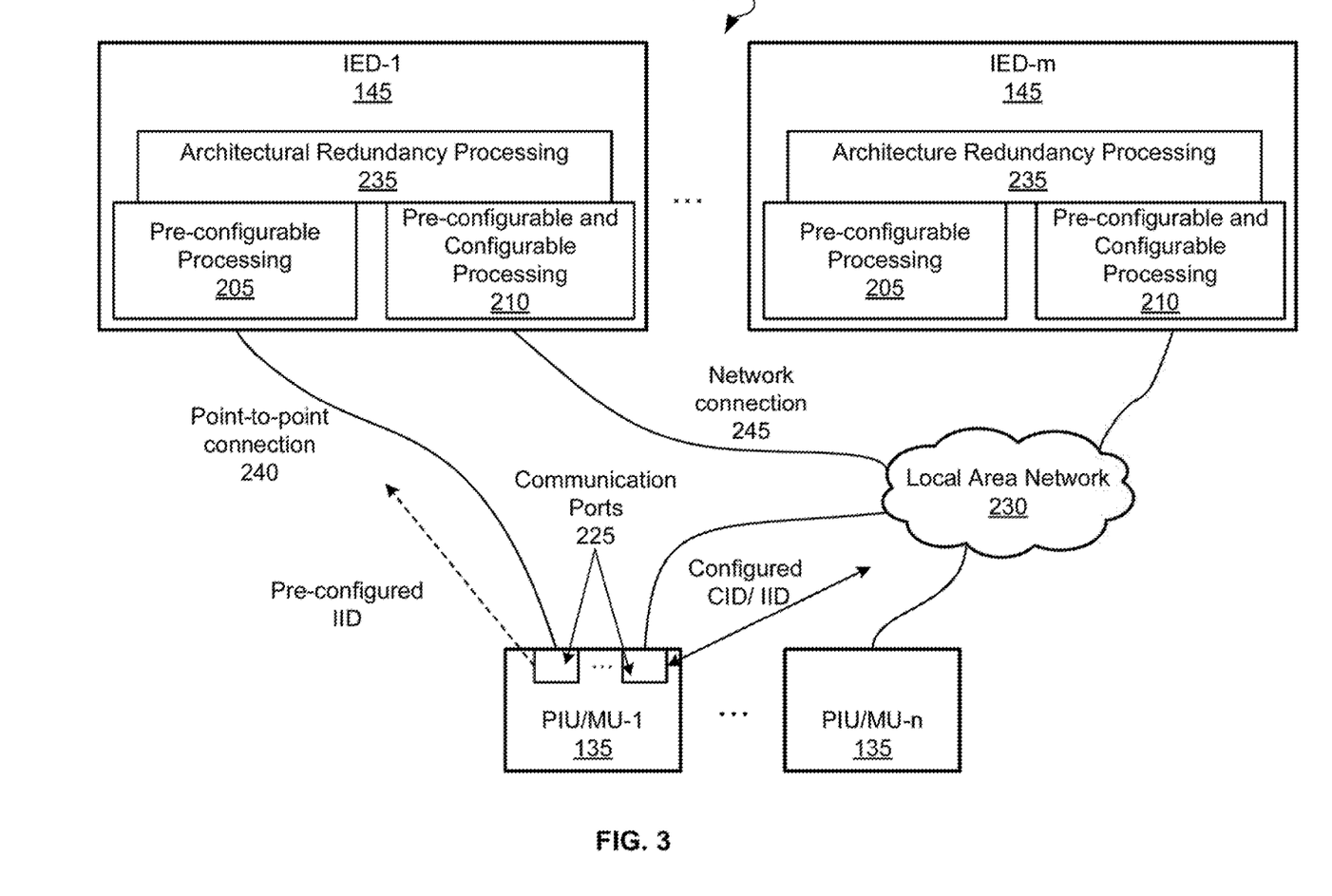
FIG. 3 is a block diagram illustrating an example configuration-less process bus with architectural redundancy, according to certain embodiments of the disclosure.

FIG. 3 is a block diagram illustrating an example system 300 for a configuration-less process bus with architectural redundancy, according to certain embodiments of the disclosure. The system 300 can include IEDs 145, PIU/MU devices 135, and LAN 230. The PIU/MUs 135 can include communications ports 225. The functionalities of the elements of the system 300 are analogous to the functionality of corresponding elements of system 200 described in FIG. 2, except for the IEDs 145. In example of FIG. 3, the IEDs 145 include an architectural redundancy processing 235.

In some embodiments of the disclosure, two alternative network ports of IEDs 145 may be configured to receive two data streams of datasets from PIU/MU 135 separately. The first (or primary) of the two alternative network ports may be configured for a dedicated point-to-point connection 240 between the IED 145 and the PIU/MU 135. In some embodiments, the point-to-point connection 240 can be pre-configured. The second (or secondary) of the two alternative ports may be connected to a shared Ethernet switch of LAN 230 to provide a configurable network connection 245 between the IED 145 and the PIU/MU 135. Thus, the IED may receive a first data stream from the PIU/MU 135 via the point-to-point connection 245 and a second data stream, or one or more other data streams, from the PIU/MU 135 via the Ethernet network connection 245. The architectural redundancy processing 235 may include analyzing the two data streams and adjusting the two data streams in order to enhance quality of the received data.

In some embodiments of the disclosure, the IED may identify the SV stream based on a time of arrival. In some embodiments, the IED may check quality and health indicators, such as quality of SV data and timestamps. The time' quality may be related to delays of frames in a data stream and missing timestamps. In some embodiments, if some of the SV data in the first data stream are missing or received with a degraded quality, the IED may look for the missed SV data in the second data stream, or in the one or more other data streams. If the quality of the corresponding SV data in the second data stream, or in the one or more other data streams, is within a predetermined tolerance, then the SV data from the second data stream, or in the one or more other data streams, can be used for further processing, such as transforming secondary values for current and voltage to primary values. In some embodiments, the IED may provide event logs and other notifications in case of identified failures in the data streams. Since the first data stream and the second data stream, or in the one or more other data streams, are obtained via two connections of different types, this approach may provide enhanced reliability of the network connection as the two connections have different modes of failure.

Figure 4:
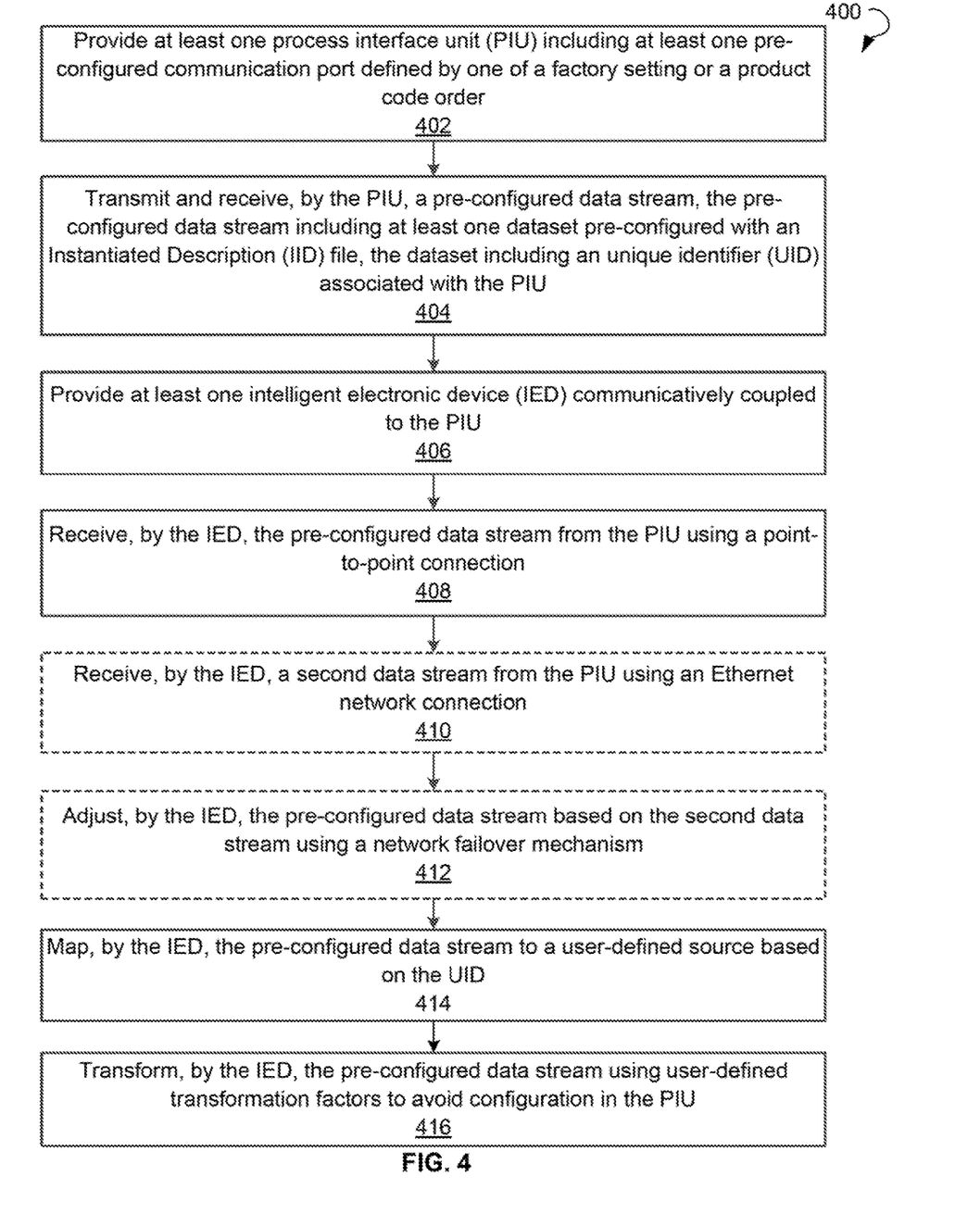
FIG. 4 is flow chart illustrating an example method for a configuration-less process bus, according to certain embodiments of the disclosure.

FIG. 4 is a flow chart illustrating an example method 400 for a configuration-less process bus, according to an embodiment of the disclosure. The method 400 can, for example, be implemented in digital substation 100. Some operations of method 400 may be embedded in program instructions of controllers of IEDs 145 and PIU/MUs 135.

In block 402, the method 400 may commence with providing at least one PIU. The PIU may include at least one pre-configured communication port defined by one of a factory setting or a product code order.

In block 404, the method 400 may transmit and receive, by the PIU, a pre-configurable data stream. The pre-configurable data stream may include at least one dataset. The dataset can include sampled values measured from a current transformer or a voltage transformer. The dataset may further include GOOSE data. The dataset may further include a unique identifier associated with the PIU.

In block 406, the method 400 may provide at least one intelligent electronic device (IED) communicatively coupled to the PIU. In block 408, the method 400 may receive, by the IED, the pre-configurable data stream from the PIU. In block 410, the method 400 may optionally receive, by the IED, a second data stream, or one or more other data streams, using a network connection. In block 412, the method 400 may optionally adjust, by the IED, the data stream using the second data stream, or the one or more other data streams, based on execution of a network failover mechanism. In block 414, the method 400 may map, by the IED, the pre-configured data stream to a user-defined source using the UID. In block 416, the method 400 may further transform, by the IED, the pre-configured data stream including sampled values and/or the GOOSE using UID and user-defined transformation factors.

Figure 5:
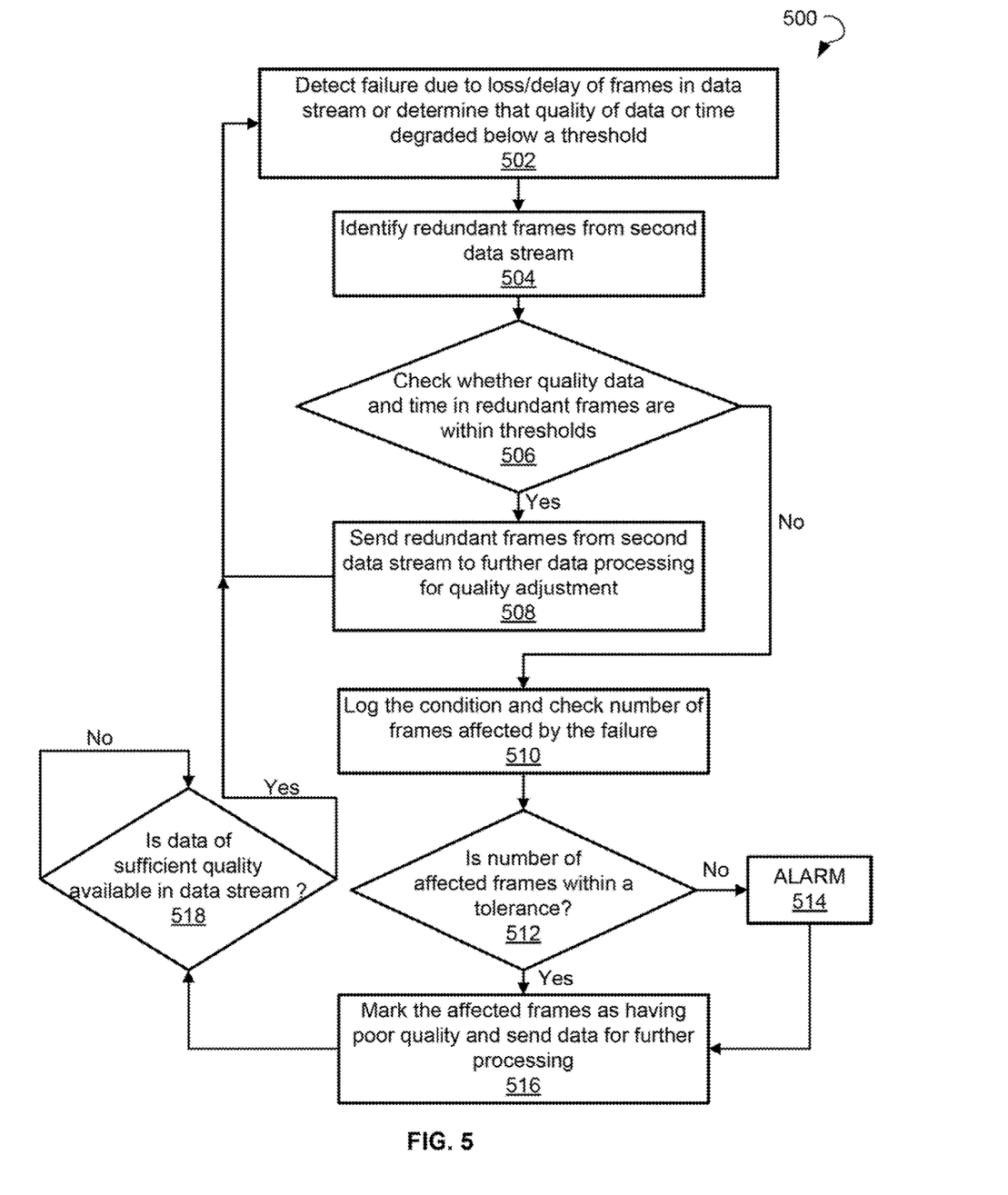
FIG. 5 is flow chart illustrating an example method for providing a network failover, according to certain embodiments of the disclosure.

FIG. 5 is a flow chart illustrating an example method 500 for a network failover mechanism, according to an embodiment of the disclosure. The method 500 can be implemented, for example, using IED 145 of system 300 described above with reference to FIG. 3. The method 500 may provide additional details for block 412 of the method 400. Operations of method 500 may be embedded in program instructions of controllers of the IEDs 145.

In block 502, the method 500 may commence with detecting a failure due to loss or delay of frames in a (first) data stream or with determining that quality of data or time has degraded below a threshold quality value. The data may include sampled values and/or GOOSE data. The threshold quality value may be independent for sampled values, GOOSE data, and time. In some embodiments of the disclosure, detecting a failure may include determining that a health indication is below a health threshold. The health indication may be associated with a behavior and/or an operation mode of the PIU sending the first data steam. In block 504, the method 500 may identify redundant frames from a second data stream, or from one or more other data streams. The redundant frames may represent the frames of the data stream that are missing or have degraded quality. In block 506, the method 500 may determine whether a quality of sampled values and timestamps in the redundant frames are within thresholds.

If the quality of the data and time in the redundant frames are within the thresholds, method 500 may proceed, in block 508, with sending the redundant frames from the second data stream, or the one or more other data streams, for further processing and quality adjustment of the sampled values obtained from the first data stream.

If the quality of the data and time in the redundant frames are not within the thresholds, then method 500 may log, in block 510, the condition of the sampled data and timestamps and check a number of the frames affected by failure. In block 512, the method 500 may determine whether a number of frames affected by the failure are within a tolerance. If the number of the frames affected by failure is not within the tolerance, then the method 500 may issue an alarm in block 514. In block 516, the method 500 may label the affected frames as having poor quality and send data for the affected frames to further processing. In block 518, the method 500 may determine whether data with good quality are available in the (first) data stream.

Figure 6:
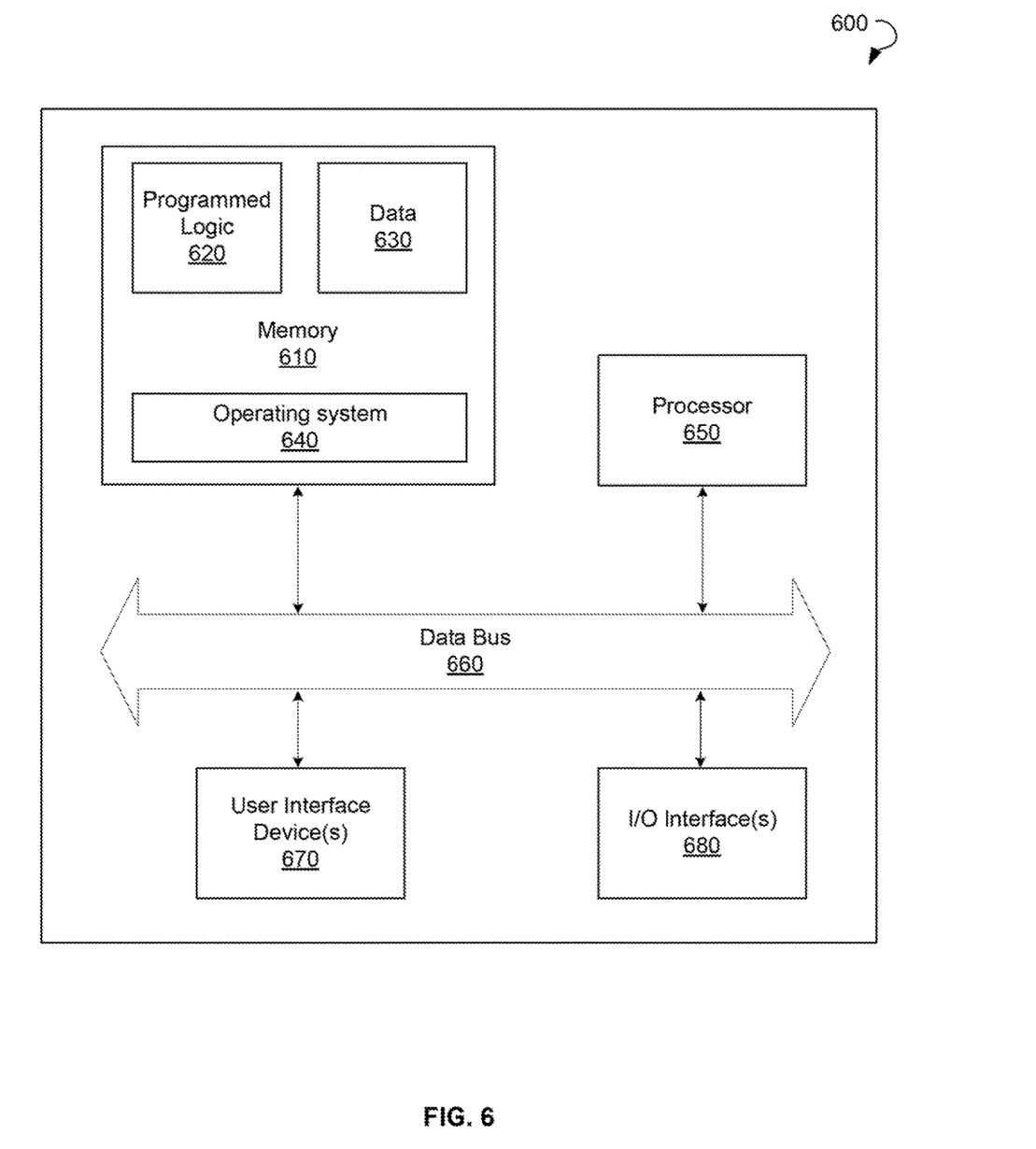
FIG. 6 is a block diagram illustrating an example controller for processing data, in accordance with an embodiment of the disclosure.

FIG. 6 depicts a block diagram illustrating an example controller 600 for processing data streams, in accordance with an embodiment of the disclosure. The controller 600 may include a memory 610 that stores programmed logic 620 (e.g., software) and may store data 630, such as geometrical data and the operation data of a substation, a dynamic model, performance metrics, and the like. The memory 610 also may include an operating system 640.

A processor 650 may utilize the operating system 640 to execute the programmed logic 620, and in doing so, may also utilize the data 630. A data bus 660 may provide communication between the memory 610 and the processor 650. Users may interface with the controller 600 via at least one user interface device 670, such as a keyboard, mouse, control panel, or any other devices capable of communicating data to and from the controller 600. The controller 600 may be in communication with the substation online while operating, as well as in communication with the substation offline while not operating, via an input/output (I/O) interface 680. More specifically, one or more of the controllers 600 may carry out the execution of the model-based control system, in order to, but not limited to, receive geometrical data and operational data associated with components of the substation, create a dynamic model of the substation for components based on the geometrical data and the operational data, generate a surrogate model for a specific performance metric based on the dynamic model, incorporate the surrogate model into an optimization procedure, and exercise the optimization procedure under an optimization objective to optimize operations of the substation for the specific performance metric. Additionally, it should be appreciated that other external devices or multiple other substations may be in communication with the controller 600 via the I/O interface 680. Further, the controller 600 and the programmed logic 620 implemented thereby may include software, hardware, firmware, or any combination thereof. It should also be appreciated that multiple controllers 600 may be used, whereby different features described herein may be executed on one or more different controllers 600.

References are made to block diagrams of systems, methods, apparatuses, and computer program products according to example embodiments. It will be understood that at least some of the blocks of the block diagrams, and combinations of blocks in the block diagrams, may be implemented at least partially by computer program instructions. These computer program instructions may be loaded onto a general purpose computer, special purpose computer, special purpose hardware-based computer, or other programmable data processing apparatus to produce a machine, such that the instructions which execute on the computer or other programmable data processing apparatus create means for implementing the functionality of at least some of the blocks of the block diagrams, or combinations of blocks in the block diagrams discussed.

These computer program instructions may also be stored in a non-transitory, computer-readable memory that can direct a computer or other programmable data processing apparatus to function in a particular manner, such that the instructions stored in the computer-readable memory produce an article of manufacture including instruction means that implement the function specified in the block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide operations for implementing the functions specified in the block or blocks.

One or more components of the systems and one or more elements of the methods described herein may be implemented through an application program running on an operating system of a computer. They also may be practiced with other computer system configurations, including handheld devices, multiprocessor systems, microprocessor based or programmable consumer electronics, mini-computers, mainframe computers, and the like.

Application programs that are components of the systems and methods described herein may include routines, programs, components, data structures, and so forth that implement certain abstract data types and perform certain tasks or actions. In a distributed computing environment, the application program (in whole or in part) may be located in local memory or in other storage. In addition, or alternatively, the application program (in whole or in part) may be located in remote memory or in storage to allow for circumstances where tasks are performed by remote processing devices linked through a communications network.

Many modifications and other embodiments of the example descriptions set forth herein to which these descriptions pertain will come to mind having the benefit of the teachings presented in the foregoing descriptions and the associated drawings. Thus, it will be appreciated that the disclosure may be embodied in many forms and should not be limited to the example embodiments described above. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for failover network, the method comprising:
   providing at least one process interface unit (PIU);
   providing at least one intelligent electronic device (IED) being communicatively coupled to the at least one PIU;
   providing an Ethernet network configured to transmit data between the at least one PIU and the at least one IED;
   receiving, by the at least one IED from the at least one PIU, in parallel:
     a pre-configured data stream via a point-to-point connection between the at least one PIU and the at least one IED; and
     one or more other data streams via the Ethernet network;
   determining, by the at least one IED, that at least one of failure conditions is satisfied, the failure conditions including:
     at least one frame in the pre-configured data stream is lost or delayed;
     a quality of the data in the at least one frame in the pre-configured data stream is below a first threshold;
     a period of a time associated with the data in the at least one frame in the pre-configured data stream is below a second threshold; and
     a health indicator associated with one of a behavior and an operation mode of the at least one PIU is below a third threshold;
   responsive to the determination that at least one of the failure conditions is satisfied, identifying, by the at least one IED, at least one redundant frame in the one or more other data streams;
   determining, by the at least one IED, that the quality of the data in the at least one redundant frame is above the first threshold and the period of the time in the at least one redundant frame is above the second threshold; and
   based on the determination that the quality of the data is above the first threshold and the period of the time is above the second threshold being positive, processing, by the at least one IED, the at least one redundant frame, wherein the processing includes at least transforming the data, wherein one or more secondary sampled values associated with the at least one redundant frame are used to replace one or more respective primary sampled values associated with the at least one frame in the pre-configured data stream.

2. The method of claim 1, further comprising:
   Based on the determination that the quality of the data is above the first threshold and the period of the time is above the second threshold being negative, determining, by the at least one IED, a number of the at least one frame in the pre-configured data stream for which the failure conditions are satisfied;
   If the number is below a tolerance threshold, labeling, by the at least one IED, the at least one frame as having a poor quality and sending the at least one frame for further processing; and
   If the number is above the tolerance threshold, issuing, by the at least one IED, at least one alarm.

3. The method of claim 1, further comprising determining, by the at least one IED, based on predetermined criteria, whether data available in the pre-configured data stream is a good quality.

4. The method of claim 1, wherein the at least one PIU includes at least one pre-configured communication port defined by one of a factory setting or a product code order.

5. The method of claim 1, wherein at least one of the pre-configured data stream and the one or more other data streams includes at least one dataset, the at least one dataset including at least one field for a unique identifier (UID).

6. The method of claim 5, further comprising mapping, by at least one IED, the at least one dataset to a user-defined source based on the UID.

7. The method of claim 6, further comprising transforming, by the at least one IED, the at least one dataset based on user-defined transformation factors to avoid configuration by the at least one PIU.

8. The method of claim 5, wherein the at least one dataset includes a Generic Object Oriented Substation Event.

9. The method of claim 5, wherein the at least one dataset includes sampled values, the sampled values including at least one of a current output directly measured from a current transformer and a voltage output directly measured from a voltage transformer.

10. A system for network failover, the system comprising:
one or more electrical substation components including at least one current transformer (CT) and at least one voltage transformer (VT);
at least one process interface unit (PIU) wired to the at least one CT and the at least one VT, wherein the at least one PIU includes at least one pre-configured communication port defined by one of a factory setting and a product code order, the at least one PIU operable to transmit and receive a data stream, the data stream including at least one dataset defined using a pre-configured IED Instantiated Description (IID) file, the at least one dataset including at least one field for:
sampled values measured from one of the at least one CT and the at least one VT;
a Generic Object Oriented Substation Event (GOOSE), the GOOSE including at least one of a status and an analog information directly measured for at least one of process transducers including at least one switchgear;
a unique identifier (UID) pre-configured by one of the factory setting or the product order code;
at least one intelligent electronic device (IED) being communicatively coupled to the at least one PIU; and
an Ethernet network configured to transmit data between the at least one PIU and the at least one IED;
wherein the at least one IED is operable to receive from the at least one PIU in parallel:
  a pre-configured data stream via a point-to-point connection between the at least one PIU and the at least one IED; and
  one or more other data streams via the Ethernet network; and wherein the at least one IED is further operable to:
determine that at least one of failure conditions is satisfied, the failure conditions including:
  at least one frame in the pre-configured data stream is lost or delayed;
  a quality of the data in the at least one frame in the pre-configured data stream is below a first threshold;
  a period of a time associated with the data in the at least one frame in the pre-configured data stream is below a second threshold; and
  a health indicator associated with one of a behavior and an operation mode of the at least one PIU is below a third threshold;
responsive to the determination that at least one of the failure conditions is satisfied, identify at least one redundant frame in the one or more other data streams;
determine that the quality of the data in the at least one redundant frame is above the first threshold and the period of the time in the at least one redundant frame is above the second threshold;
based on the determination that the quality of the data is above the first threshold and the period of the time is above the second threshold being positive, use the at least one redundant frame for processing, the processing including at least transforming the data;
based on the determination that the quality of the data is above the first threshold and the period of time is above the second threshold being negative, determine a number of the at least one frame in the pre-configured data stream for which the failure conditions are satisfied;
if the number is below a tolerance threshold, label the at least one frame as having a poor quality and send the at least one frame for further processing, wherein one or more secondary sampled values associated with the at least one redundant frame are used to replace one or more respective primary sampled values associated with the at least one frame in the pre-configured data stream;
if the number is above the tolerance threshold, issue at least one alarm; and
determine, based on predetermined criteria, whether the pre-configured data stream is a good quality.

* * * * *